Oct. 17, 1961 T. J. THOMPSON 3,005,100
NUCLEAR SCINTILLATION MONITOR
Filed June 12, 1956 2 Sheets-Sheet 1

INVENTOR.
THEOS J. THOMPSON
BY Rines and Rines

Oct. 17, 1961     T. J. THOMPSON     3,005,100
NUCLEAR SCINTILLATION MONITOR
Filed June 12, 1956     2 Sheets-Sheet 2

INVENTOR.
THEOS J. THOMPSON
BY *Rines and Rines*

United States Patent Office 3,005,100
Patented Oct. 17, 1961

3,005,100
NUCLEAR SCINTILLATION MONITOR
Theos J. Thompson, Belmont, Mass.
(14th Everett Ave., Winchester, Mass.)
Filed June 12, 1956, Ser. No. 590,933
15 Claims. (Cl. 250—71.5)

The present invention relates to nuclear-radiation detectors and methods of detection and, more particularly, to detectors of the scintillation type.

Liquid, gaseous and solid scintillation counters are currently employed to detect nuclear radiations as described, for example, in Nucleonics, McGraw Hill, April 1956, pages 33 to 53. The term "nuclear radiations," as used herein, is intended to embrace charged particles and radiations including particles and radiations emitted by a nucleus in the process of any nuclear transition including $\alpha$, $\beta$ particles and $\gamma$ radiation, fission fragments and the like. In some scintillation-counting systems, a small crystal of scintillation material is disposed within or exposed through the wall of a gas or fluid-filled chamber to nuclear radiations within the chamber. A photomultiplier or similar detector monitors the scintillation radiations emitted from the scintillation material in response to the impingement of nuclear radiations thereupon. In such systems, the scintillation counter will thus only sample, for example, $\alpha$ or $\beta$ nuclear radiations produced in a small volume of the chamber which may not be a representative sample of the nuclear radiation distribution throughout the chamber and, at best, provides a relatively weak counting action. Relatively low counting efficiency is thus obtained. Other types of scintillators, moreover, including liquid scintillators, are not well adapted for representatively sampling $\alpha$ and $\beta$ particles and the like with gaseous or other fluid media.

An object of the present invention, accordingly, is to provide a new and improved nuclear-radiation detector of the scintillation type and a novel method of scintillation counting that shall provide high counting efficiencies.

A further object is to provide a scintillation counter of particularly high sensitivity to $\alpha$ and $\beta$ particles and other highly ionizing particles.

Other and further objects will be explained hereinafter and will be more particularly pointed out in the appended claims. In summary, the novel results of the present invention are obtained with the aid of scintillation material disposed within a fluid medium containing nuclear radiations to be detected and extending along an appreciable portion of the fluid medium to produce scintillation radiations in response to nuclear radiations in an appreciable portion of the fluid medium. Monitor means is provided sensitive to the scintillation radiations for receiving the same and producing an indication of such reception. Preferred constructional details are herein after set forth.

The invention will now be described in connection with the accompanying drawings.

FIG. 1 of which is a longitudinal section of a chamber containing a preferred embodiment of the invention;

Figure 1:
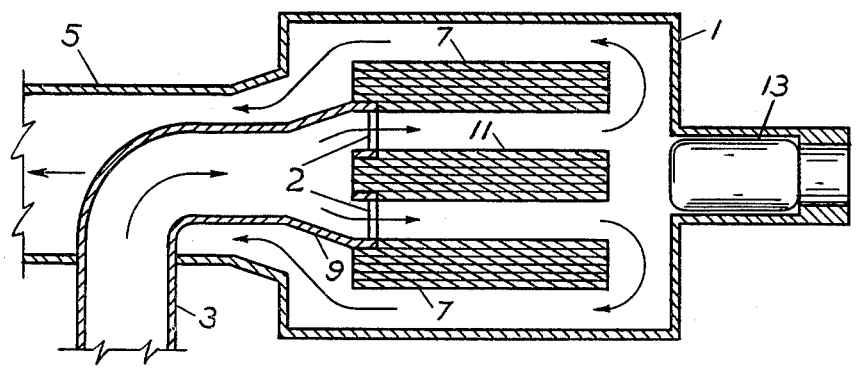

Referring to FIG. 1, a chamber 1 is shown provided with a re-entrant inlet 3 and an outlet 5 for permitting the circulation within the chamber 1 of a fluid medium containing nuclear radiations to be detected, such as an air medium. The term "fluid," as used in the specification and claims, includes both gases and liquids. The invention is particularly useful with gaseous media. While, moreover, a fluid-circulating system is disclosed, it is to be understood that the chamber 1 may be filled with a fluid medium and then closed off for radiation-detection measurements, being later emptied.

In accordance with the present invention, scintillation material, preferably of the solid type, such as of plastic material, is disposed within and extends along the chamber 1 throughout an appreciable portion of the volume of the fluid medium therein or surrounds appreciable fluid-medium volumes. Through this construction, the nuclear radiations in an appreciable portion of the fluid medium, as contrasted with the before-described prior-art minute sampling, act upon the scintillation material and produce large cumulative scintillation radiation effects. The scintillation material in FIG. 1 is shown in the form of a hollow cylinder 7 extending from the diverging mouth 9 of the inlet 3 along the major portion of the chamber 1. Between the spaced inner walls of the cylinder 7 a further solid scintillation member 11, of cylindrical or other geometrical shape, may be axially supported by means of, for example, radial struts or supporting members 2 as of plastic and even scintillation material itself. Appreciable portions of the fluid-medium volume, therefore, are juxtaposed to the inner and outer surfaces of the scintillation member 7 and the outer surfaces of the scintillation member 11, providing a very large sampling of the nuclear radiation in the fluid medium. A counting geometry of almost $4\pi$ can, indeed, be obtained. When the fluid medium circulates in the channels or spaces between the inner walls of the member 7 and the outer walls of the member 11 and then along the outer walls of the member 7, as shown by the arrows, the nuclear radiations associated with the fluid medium will result in the emission of photons in the scintillation members 7 and 11, producing, for example, scintillation light radiation. This scintillation radiation produced in response to the nuclear radiations in an appreciable portion of the fluid medium may be received or monitored at the end of the chamber 1 by a photomultiplier tube circuit 13 which can produce an electrical indication of the scintillation phenomenon representative of the nuclear radiations in the fluid medium. In view of the above-described construction, very high counting efficiencies are obtained. Particularly high sensitivities to $\alpha$ and $\beta$ particles are thereby provided.

Suitable solid scintillation materials that can be molded or fabricated in the desired configurations include, for example, polystyrene plastic with para-terphenyl, polyvinyl toluene plastic with para-terphenyl, and anthracene, to mention but a few. The material of the present invention should preferably be light-transmitting, as can be effected with such plastic materials, in order to permit scintillation light radiations from all parts of the scintillation members to reach the phototube 13.

Figure 2:
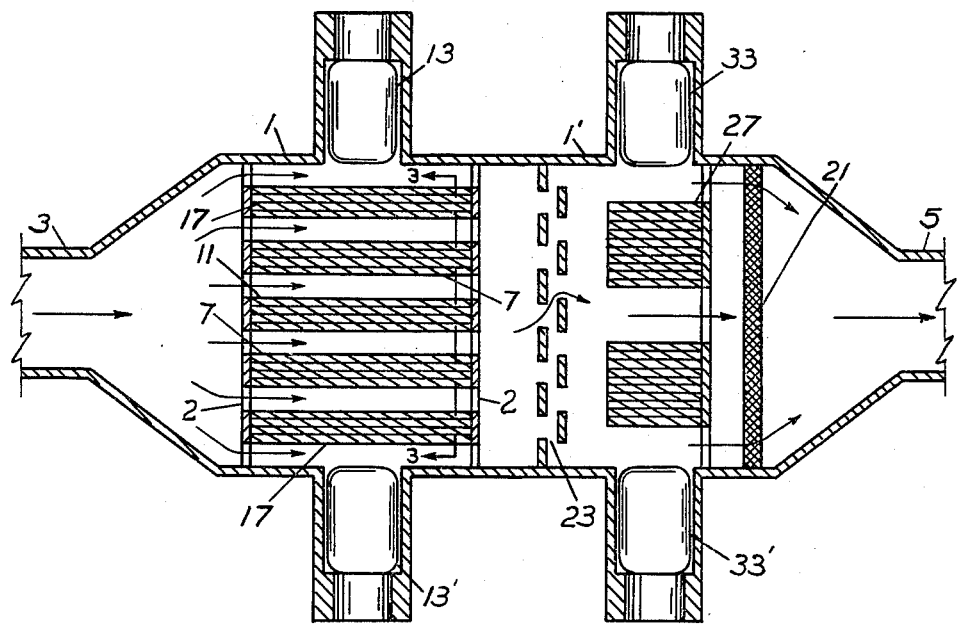
FIG. 2 is a similar view of a modification.
Figure 3:
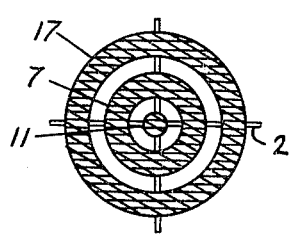
FIG. 3 is a section taken upon the line 3—3 of FIG. 2, looking in the direction of the arrows.

In the left-hand portion of the system of FIG. 2 and in FIG. 3, a further concentric outer cylindrical scintillation member 17 is shown spaced from and surrounding the scintillation cylinder 7 and the inner scintillation member 11, the members being supported by the before-mentioned supports 2 within the chamber 1. Even greater sampling of the nuclear radiations in the fluid medium is thus achieved in the view of the greater area of scintillation material juxtaposed to the fluid medium. A pair of phototubes 13, 13' are shown disposed in the side walls of the chamber 1, monitoring the scintillation radiations. The system of FIG. 1 could similarly be monitored at the side walls of the chamber 1. The light-transmitting scintillation material of the members 11, 7, 17 will permit the phototubes 13, 13' to receive the scintillation radiations from all parts of the scintillation members.

If it is desired to monitor particulate matter which is radioactive, a filter 21, as of glass wool and the like, may be employed, as shown in the right-hand chamber portion 1' of FIG. 2. While the chamber portion 1' is shown as an extension of the left-hand chamber 1, being separated therefrom by a fluid-medium-transmitting but light-blocking-baffling structure 23, it may be an entirely separate chamber completely disassociated from the chamber 1. The chamber portion 1' could then be used as a gas or fluid monitor for radioactive particulate matter. A scintillation cylinder 27 may be mounted adjacent the filter 21 within the chamber 1' to be subjected to the nuclear radiations from the particles trapped by the filter 21. The filter may, if desired, through adjustment of its mesh, selectively trap radiation-carrying particles of predetermined sizes. As hereinafter explained, the thickness of the walls of the scintillation material 27 may be adjusted to produce selective response to predetermined raditions and radiation energy limits. Again, side-wall phototube monitors 33 and 33' may be employed.

Figure 6:
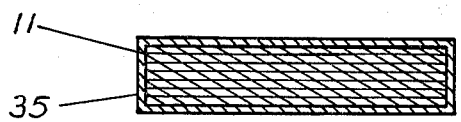
FIG. 6 is a side elevation of a modified scintillation member.

In the systems of FIGS. 1 and 2, and the hereinafter described embodiments of the invention, the chambers are rendered light-tight, as with the aid of well-known baffles and the like, similar, for example, to the baffles 23 of FIG. 2. The walls of the chamber, moreover, and, indeed, selected portions of the surfaces of the scintillation material itself may be lined with light-reflecting linings further to reflect and direct the scintillation radiations to the phototubes. All of the scintillation members of the present invention, moreover, may be provided with a thin layer or layers of nuclear and photon radiation-transmitting material, such as a thin plastic layer 35, as of transparent polyethylene or polystyrene, shown associated with the scintillation member 11 in FIG. 6, which may be removed and replaced after a period of use to effect de-contamination of the apparatus.

Figure 4:
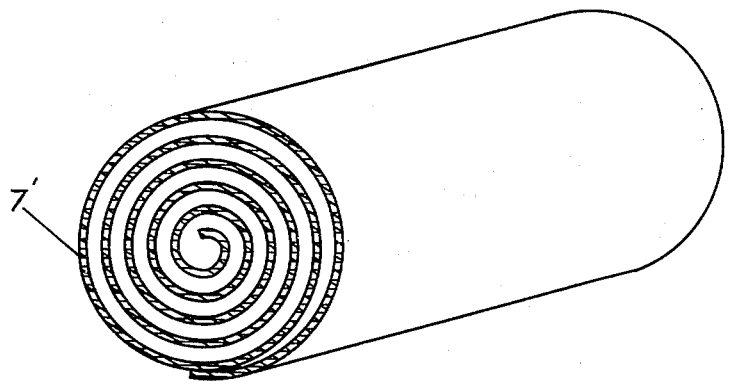
FIGS. 4 and 5 are views of further modifications.

In the case of $\alpha$-particle nuclear radiations, which can produce scintillation effects in very thin scintillation-material layers, scintillation members of extreme thinness may be employed, even of the order of mils; say one to five mils, more or less. This provides for the use of a large number of surfaces of scintillation material and extremly high counting efficiency. A convenient configuration for such use may be a cylindrical surface wound in spiral form, as shown at 7' in FIG. 4.

Thicker-walled scintillation members are adapted for $\beta$-particle nuclear radiations; $\beta$-particle radiations of low energy levels, say with a maximum energy of about 0.2 mev., requiring scintillation members of substantially 0.1 millimeter thickness, more or less, and $\beta$ radiations of high energy levels, say of the order of 1 or 2 mev., requiring thicker members of substantially 1 centimeter, more or less. The present invention is thus adapted, by the control of the thickness and position of the scintillation members, to respond somewhat selectively to radiations of predetermined energy levels.

Figure 5:
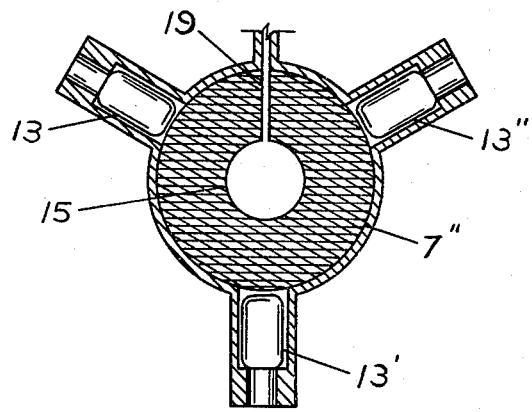

Radiation particles of the $\gamma$ type, on the other hand, have a relatively long penetration distance so that as thick a scintillation member as possible is desirable. In actual practice, a compromise between the total amount of scintillation material and the extent of the sample of the fluid-medium volume to be monitored is effected. A system such as the thick-walled spherical scintillation-material chamber 7" of FIG. 5 may be used containing a cavity 15 into which the fluid medium may be fed by an inlet 19. A plurality of equal-angular spaced phototubes 13, 13' and 13" may then be employed.

Further modifications will occur to those skilled in the art and all such are considered to fall within the spirit and scope of the invention as defined in the appended claims.

What is claimed is:

1. Apparatus for detecting nuclear radiations associated with a predetermined volume of a fluid medium having, in combination, at least one hollow member of scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

2. Apparatus for detecting nuclear radiations associated with a predetermined volume of a fluid medium having, in combination, at least one cylinder of scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

3. Apparatus for detecting nuclear radiations associated with a predetermined volume of a fluid medium having, in combination, a plurality of spaced members of scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

4. Apparatus for detecting nuclear radiations associated with a predetermined volume of a fluid medium having, in combination, a plurality of spaced members of light-transmitting scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

5. Apparatus for detecting nuclear radiations associated with a predetermined volume of a fluid medium having, in combination, a plurality of substantially concentric hollow cylinders of scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

6. Apparatus for detecting nuclear radiations associated with a predetermined volume of a fluid medium having, in combination, a plurality of substantially concentric light-transmitting hollow cylinders of scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means sensitive to the scintillation radiations for receiving the same through the fluid medium and producing an indication of such reception.

7. Apparatus for detecting nuclear radiations associated with a predetermined volume of a fluid medium having, in combination, scintillation material disposed within the fluid medium and extending along an appreciable portion thereof for producing scintillation radiations in response to the nuclear radiations in an appreciable portion of the fluid medium, the fluid medium being scintillation-radiation transmitting, at least one nuclear-radiation transmitting layer disposed upon the scintillation material and removable therefrom to permit of decontamination, and monitor means sensitive to the scintillation radiations for receiving the same through the fluid medium and producing an indication of such reception.

8. Apparatus for detecting nuclear radiations associated with a predetermined volume of a fluid medium having, in combination, scintillation material disposed within the fluid medium and extending along an appreciable portion thereof for producing scintillation radiations in response to the nuclear radiations in an appreciable portion of the fluid medium, at least one nuclear- and photon-radiation transmitting layer disposed upon the scintillation material and removable therefrom to permit of decontamination, the fluid medium being scintillation-radiation transmitting, and monitor means sensitive to the scintillation radiations for receiving the same through the fluid medium and producing an indication of such reception.

9. Apparatus for detecting nuclear radiations associated with a predetermined volume of a fluid medium having, in combination, scintillation material disposed within the fluid medium and extending along and in contact with an appreciable portion of the predetermined volume of the fluid medium for producing scintillation radiations in response to the nuclear radiations in an appreciable portion of the fluid medium, the fluid medium being scintillation-radiation transmitting, and monitor means spaced from said scintillation material by said fluid medium and sensitive to the scintillation radiations for receiving the same through the fluid medium between said scintillation material and said monitor means and producing an indication of such reception, whereby said scintillation material is in contact with the fluid medium in the space between said material and said monitor means to enhance its efficiency.

10. Apparatus for detecting nuclear radiations associated with a predetermined volume of a fluid medium having, in combination, solid scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means spaced from said scintillation material by said fluid medium and sensitive to the scintillation radiations for receiving the same through the fluid medium between said scintillation material and said monitor means and producing an indication of such reception, whereby said scintillation material is in contact with the fluid medium in the space between said material and said monitor means to enhance its efficiency.

11. Apparatus for detecting nuclear radiations associated with a predetermined volume of a fluid medium having, in combination, solid plastic scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means spaced from said scintillation material by said fluid medium and sensitive to the scintillation radiations for receiving the same through the fluid medium between said scintillation material and said monitor means and producing an indication of such reception, whereby said scintillation material is in contact with the fluid medium in the space between said material and said monitor means to enhance its efficiency.

12. Apparatus for detecting nuclear radiations associated with a predetermined volume of a fluid medium having, in combination, light-transmitting solid scintillation material disposed within the fluid medium and extending along an appreciable portion thereof for producing scintillation radiations in response to the nuclear radiations in an appreciable portion of the fluid medium, the fluid medium being scintillation-radiation transmitting, and monitor means spaced from said scintillation material by said fluid medium and sensitive to the scintillation radiations for receiving the same through the fluid medium between said scintillation material and said monitor means and producing an indication of such reception, whereby said scintillation material is in contact with the fluid medium in the space between said material and said monitor means to enhance its efficiency.

13. Apparatus for detecting nuclear radiations associated with a predetermined volume of a fluid medium having, in combination, scintillation material disposed within the fluid medium and extending along an appreciable portion thereof for producing scintillation radiations in response to the nuclear radiations in an appreciable portion of the fluid medium, trapping means disposed within the fluid medium for trapping particles carried by the fluid medium in order that the nuclear radiations associated with the trapped particles may react upon the scintillation material, the fluid medium being scintillation-radiation transmitting, and monitor means spaced from said scintillation material by said fluid medium and sensitive to the scintillation radiations for receiving the same through the fluid medium between said scintillation material and said monitor means and producing an indication of such reception, whereby said scintillation material is in contact with the fluid medium in the space between said material and said monitor means to enhance its efficiency.

14. Scintillation apparatus comprising a nuclear-radiation scintillating member having a solid surface exposed to nuclear radiation from an adjacent nuclear radiating medium, said surface being covered by a separate removable nuclear-radiation transmitting layer that is in contact with said medium and is removable from said surface to effect decontamination and the like.

15. Scintillation apparatus comprising a nuclear-radiation scintillating member having a solid surface exposed to nuclear radiation from an adjacent nuclear radiating medium, said surface being covered by a separate removable nuclear-radiation-and-photon-transmitting layer that is in contact with said medium and is removable from said surface to effect decontamination and the like.

References Cited in the file of this patent

UNITED STATES PATENTS

| | | |
|---|---|---|
| 2,576,616 | Livingston et al. | Nov. 27, 1951 |
| 2,598,215 | Borkowski et al. | May 27, 1952 |
| 2,625,657 | Kanne | Jan. 13, 1953 |
| 2,710,284 | Hyman | June 7, 1955 |
| 2,711,482 | Goodman | June 21, 1955 |
| 2,725,484 | McKee | Nov. 29, 1955 |
| 2,733,216 | Eichholz et al. | Jan. 31, 1956 |
| 2,744,199 | Juterbock | May 1, 1956 |
| 2,750,514 | Armistead | June 12, 1956 |
| 2,755,391 | Keys | July 17, 1956 |
| 2,759,107 | Armistead et al. | Aug. 14, 1956 |
| 2,768,307 | Tirico | Oct. 23, 1956 |
| 2,892,091 | Sawle | June 23, 1959 |

OTHER REFERENCES

Monitor Measures Air and Surface Contamination, by Watts et al., Nucleonics, vol. 13, No. 1, January 1955, pages 51 and 52.